Dec. 23, 1952  E. SCHMID  2,622,355
CINEMATOGRAPHIC PICTURE PRODUCER
Filed June 17, 1950  2 SHEETS—SHEET 1
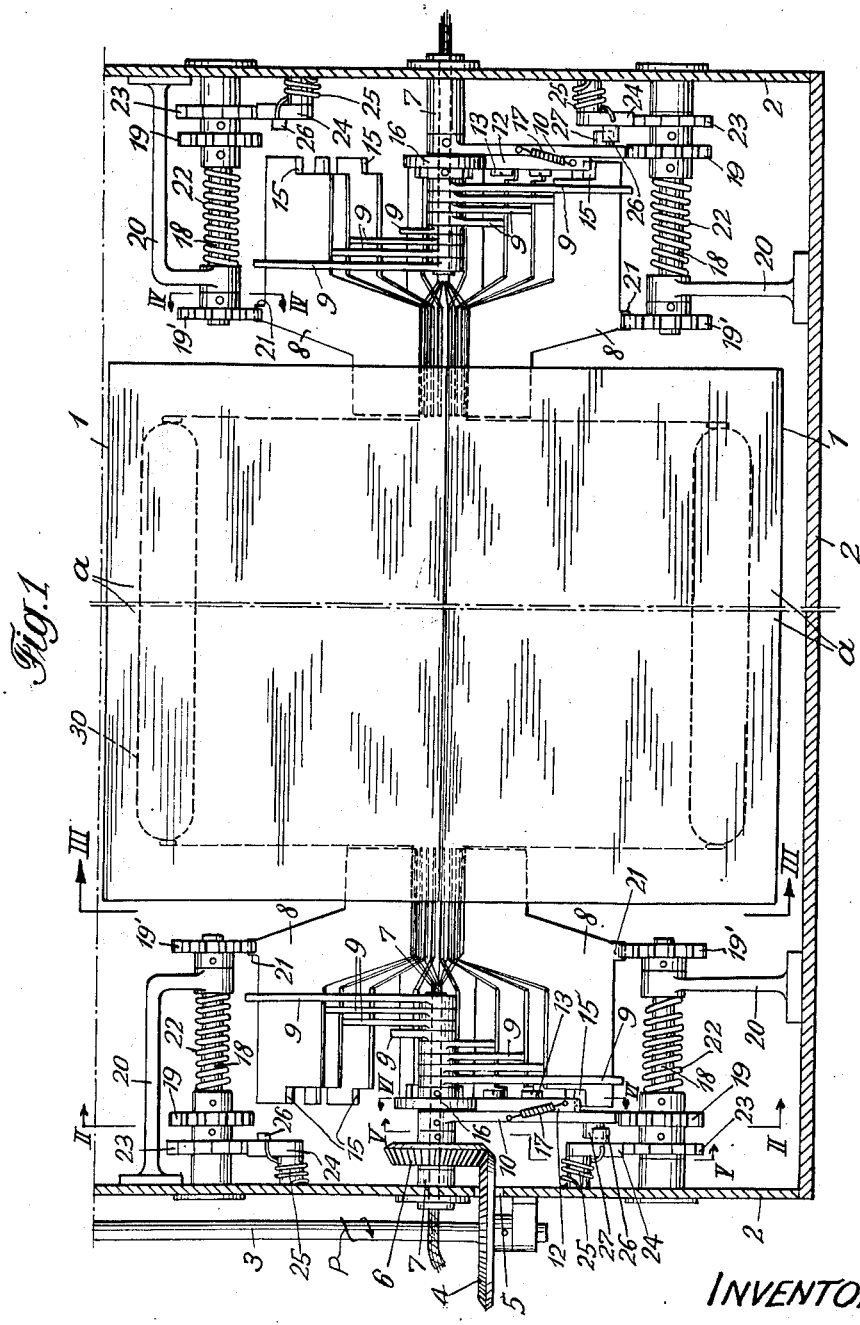
INVENTOR:
EMIL SCHMID
BY Wenderoth, Lind
& Ponack
ATTORNEYS

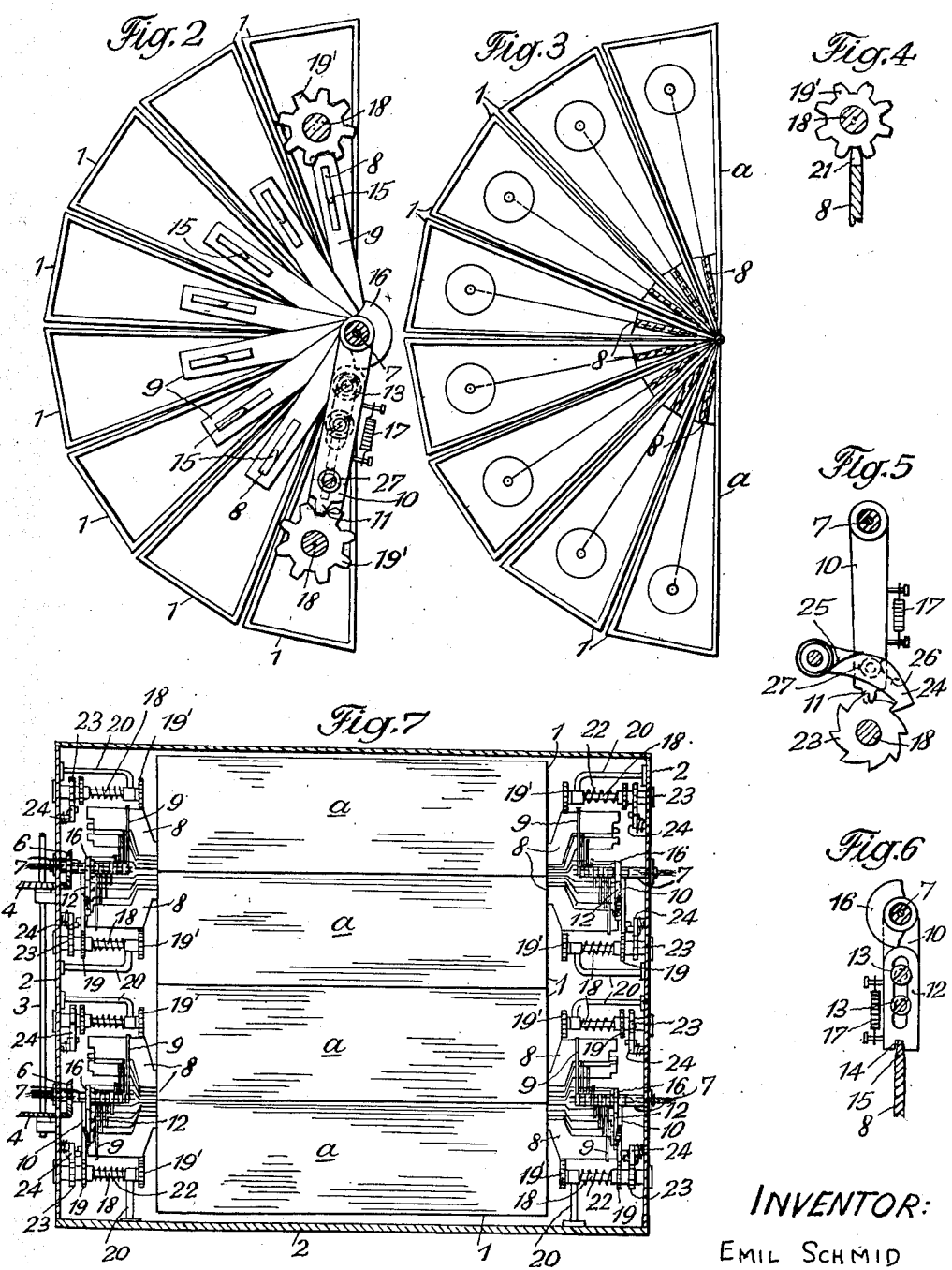

Patented Dec. 23, 1952

2,622,355

UNITED STATES PATENT OFFICE 2,622,355

CINEMATOGRAPHIC PICTURE PRODUCER

Emil Schmid, Zurich, Switzerland

Application June 17, 1950, Serial No. 168,741
In Switzerland June 18, 1949

2 Claims. (Cl. 40—67)

This invention relates to cinematographic picture producers which for example may be used for advertising or like purposes.

The picture producer according to the invention comprises groups of superposed wedge-shaped members having triangular side faces which act as picture carriers, and driving means are provided to swing the members of each group successively around a common axis to such a position, in which a picture area is being produced by two successive members of each group which are angularly displaced relative to each other by 180° and wherein illumination means may be provided within the members to illuminate the picture area from the interior of the members for which purpose the members can be made hollow and transparent.

The invention will now be described with reference to the accompanying drawings showing a preferred embodiment of a cinematic picture producer.

Fig. 1 is a front view of a part of the picture producer,

Fig. 2 is a section along the line II—II of Fig. 1,

Fig. 3 is a section along the line III—III of Fig. 1,

Fig. 4 is a section along the line IV—IV of Fig. 1,

Fig. 5 is a section along the line V—V of Fig. 1,

Fig. 6 is a section along the line VI—VI of Fig. 1, and

Fig. 7 is a front view of the picture producer drawn to a smaller scale and comprising two superposed groups of picture area forming members.

As represented in the drawings a number of wedge-shaped members 1 are forming one of the superposed groups. The wedge edges or summits of the members 1 of each group approximately are located in one common axis, whereby the clearance or gap between two wedge edges is relatively small as for example $\frac{1}{10}$ mm. The wedge members of each group are mounted for pivoting movement about the said common axis, the members being connected to driving means as will be described in the following.

In the position of the wedge members, shown in Figs. 1, 2, 3 and 7, the surfaces $a$ of the two members placed at 180° one relatively to the other of each group form a picture area, which is divided into rectangular fields. The wedge faces are painted or covered with pictures or they can carry inscriptions, so that a cinematographic effect will be produced in case the sides $a$ belonging to a picture area, or the corresponding wedge members 1 of each group, will successively be turned at predetermined intervals. The two surfaces $a$ of each group of superposed members can be turned together or in succession into the said position around the corresponding axis. The distance between two adjacent fields $a$ of two superposed groups also is very small, as for example 1 mm., so that upon operation of the apparatus, one has the impression of seeing a closed single picture area. It may be readily recognized that such small clearances between the single fields $a$ can only be obtained by the wedge-shape of the members 1 which are arranged in groups.

In the represented example (Fig. 7) two such groups are mounted in superposed relation in a frame 2. Along the side wall of the frame a vertical driving shaft 3 is mounted, which for example may be in driving connection with an electric motor, which, however, is not represented, for example by the intermediary of a gear. The driving shaft 3 is provided with bevel wheels 4, which are extending thru openings in the wall of the frame and which are engaging bevel wheels 6 mounted on the swing shaft 7 which is located in the said common axis of rotation of each group. The swing shafts 7 are rotatably mounted in the frame 2, and on the side of the members 1 remote of the driving shaft 3 a second series of swing shafts 7 are provided. To both sides of the radially, inner end portions of each wedge shaped member are fixed flat supporting arms 8. The axially extending ends of these arms 8 are connected to radially extending carrier rods 9, which on the other end are pivotally mounted on the corresponding swing shaft 7. A ratchet lever 10 is mounted on each swing shaft 7, the free end of which is provided with a ratchet tooth 11. The inner side of each ratchet lever 10 carries a slidably mounted driver 12, this driver 12 being provided with a longitudinal slot. Bolts 13 extending through the slot of the driver 12 and screwed to the ratchet-lever 10 are used as abutments. The outer end of the driver 12 is provided with a cavity 14 (Fig. 6) destined to coact with noses 15, which are provided on the free ends of the supporting arms 8. The inner end of the driver 12 cooperates with a cam disc 16 which is rotatably movable on the swing shaft 7, whereby the driver 12, by the action of a spring 17 fastened to the ratchet lever 10, is pressed against the periphery of the cam disc 16. The ratchet tooth 11 of each ratchet lever 10 is destined to coact with gear wheels 19, each of which is mounted on an auxilary axis 18. These auxilary axes 18 are symmetrical with regard to the corresponding swing axis 7 in the frame 2, and are mounted on extending parts 20 which are fastened to the frame 10. A further gear wheel 19' is mounted on the free end of each auxiliary shaft 18, and coacts with catch teeth 21 (Fig. 4), provided on the outer side of the axially extending parts of the supporting arms 8. In order to avoid free rotation of the auxiliary axis 18 or of the gear-wheels 19, a brake spring 22 is provided on the center part of the auxiliary axis 18, which is abutting under tension on the outer gear-wheel 19, as well as on the bracket 20. Each auxiliary axis carries a ratchet wheel 23 (Fig. 5), which is engaged by a pawl 24 (Fig. 5) pivotally mounted in the frame 2, and which by means of a spring 25 is kept in engagement with the ratchet wheel 23. Each pawl 24 carries a releasing plate 26, with which coacts a releasing member 27, the latter being fastened to the ratchet lever.

The operation of the described driving means is as follows: It is assumed that each wedge-shaped member 1 of a group shall simultaneously be swung from its lower to its upper position, where it shall stay for a short time interval, until it will be displaced by the following wedge member. Assuming that the picture producer is in the position, which is shown in the drawing. The driving shaft 3 will now be turned with constant speed in the direction of the arrow P shown in Fig. 1 which will cause the ratchet levers 10 to swing upwardly by the intermediary of the bevel gear pair 4, 6 and the corresponding swing shaft 7. As a result the pawl 24 will be lifted off the ratchet wheel 23 by the disengaging device 27 against the action of the spring 25, the ratchet wheel 19 simultaneously being advanced one tooth by the ratchet tooth 11 of the lever 10. The ratchet lever 10 will thereby be disengaged from the gear-wheel 19, and the inner gear wheel 19' which also turns, will release the catchtooth 21 of the supporting arm 8. As the inner end of the driver 12 in the represented lower end position is outwardly displaced by the cam disc 16 into engagement with the nose 15 of the corresponding supporting arm 8, this latter and therefore also the lowest wedge member 1 of each group is connected with the driving shaft 3 and therefore will be swung upwardly. At the same time the next lower wedge member 1 due to its weight will advance to the lowest end position, the catch teeth 21 of its supporting arms 8 thus moving into engagement with the corresponding gear wheel 19'. Further rotation of the auxiliary axle 18 or of the lowest wedge member 1 will be prevented by the lower pawls 24, which again will become engaged with the corresponding ratchet wheel 23. In the meantime the wedge member 1 which has swung upwardly is approaching its upper end position. The driver 12 upon reaching the end of the cam of the disc 16 moves inwardly under the action of the spring 17, thereby releasing the nose 15 i. e. the corresponding supporting arm 8 of the wedge member. At the same time the ratchet tooth 11 of the ratchet lever 10 engages the corresponding gear wheel 19, the disengaging device 26 thereby releasing the ratchet wheel 24. The upper auxiliary axis 18, i. e. the gear wheel 19 as a result will turn, the supporting arms 8 of the swung wedge member 1 by means of its catch teeth 21 thereby will be locked by the inner gear wheels 19'. At the same time, however, the rotation of the upper auxiliary axis 18 will cause the releasing of the supporting arms 8 of the member 1 which, until arrival of the swung wedge member, remains in the highest position. In case the supporting arms 8 of the swung wedge member i. e. its catch teeth 21 are in engagement with the gear wheels 19', the releasing device 27 will release again the pawl 24 and thus locks the ratchet wheel 23, the driver 12, due to the construction of the cam disc 16 shown in Fig. 6, will be moved radially and inwardly under the action of the spring 7, the cavity 14 thus releasing the nose 15 of the corresponding supporting arm 8. By further turning the driving shaft 3, the ratchet levers 10 without engaging the supporting arms 8 of a member 1, will also be turned, until they arrive in the starting position, shown in Figs. 1, 2 and 7. The wedge members as a result will stay at rest during that period.

As shown in Figs. 2 and 3, the wedge-shaped members 1 of the described example are constructed as transparent hollow bodies with open front faces, it thus being possible to illuminate the picture area by a light source, being placed laterally of the body or within the body for example as shown at 30 in Figures 1 and 3. It is clear, that it also will be possible to employ solid wedge-shaped members which are not illuminated. Also the number of the members of a group, as well as the number of the superposed groups may be chosen as desired. The construction of the driving means also may differ from the example shown and described. The wedge members may for instance be driven by means of both swing shafts of each group, or the arrangement of the corresponding members could be such, that these members will not simultaneously be moved as described, but successively one after the other. The driving means also may be of such a construction, that the wedge-shaped members rotate in opposite direction from the top to the bottom.

I claim:

1. A cinematographic picture producer comprising superposed groups of wedge-shaped members, driving means operatively connected to said members to successively swing the members of each group about a common axis into a position in which a picture area will be produced by the faces of two wedge-shaped members of each group situated at 180° one relatively to the other, the wedge edges of said members of each group being located substantially in said common axis of rotation, said driving means comprising a driving shaft common to all groups of wedge-shaped members and arranged laterally of the groups, one bevel wheel per group, swing-shafts located on both sides of each group and coaxial with said axis of rotation, bevel wheels mounted on said swing shafts disposed in proximity to said driving shaft and cooperating with said first mentioned bevel wheels, a ratchet lever on each swing shaft, a driver, longitudinally slidable on each ratchet lever, supporting arms having a nose mounted on both sides of the radially inner face portions of each wedge-shaped member, said nose coacting with one end of said driver, supporting rods connected to said supporting arms and pivotally mounted on the corresponding swing shaft, and cam discs rotatably movable by said swing-shafts to coact with the other end of the corresponding driver.

2. A cinematographic picture producer as claimed in claim 1 and wherein said wedge-shaped members are hollow and transparent, said driving means being adapted to swing successive members of each group about the common axis to a position producing a picture area by two surfaces of successive members of each group which are angularly displaced by 180°, relatively to each other, and wherein illumination means are within said members to illuminate the picture area from the interior of the hollow member.

EMIL SCHMID.

REFERENCES CITED

The following references are of record in the file of this patent:

UNITED STATES PATENTS

| Number | Name | Date |
|---|---|---|
| 522,979 | Fawkes | July 17, 1894 |
| 739,635 | Anderson | Sept. 22, 1903 |
| 2,458,657 | Torrence et al. | Jan. 11, 1949 |